US008942060B2

(12) United States Patent
Abma et al.

(10) Patent No.: US 8,942,060 B2
(45) Date of Patent: Jan. 27, 2015

(54) METHOD AND APPARATUS FOR MARINE WIDE AZIMUTH TOWED STEAMER SEISMIC ACQUISITION

(75) Inventors: Raymond Lee Abma, Houston, TX (US); Gerard Beaudoin, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 752 days.

(21) Appl. No.: 13/196,614

(22) Filed: Aug. 2, 2011

(65) Prior Publication Data

US 2012/0033525 A1 Feb. 9, 2012

Related U.S. Application Data

(60) Provisional application No. 61/369,912, filed on Aug. 2, 2010.

(51) Int. Cl.
*G01V 1/38* (2006.01)

(52) U.S. Cl.
CPC ................................ *G01V 1/3808* (2013.01)
USPC ............................................................ 367/20

(58) Field of Classification Search
USPC ............................................................ 367/20
See application file for complete search history.

(56) References Cited

U.S. PATENT DOCUMENTS

| | | | |
|---|---|---|---|
| 6,906,981 B2 * | 6/2005 | Vaage | 367/21 |
| 7,391,673 B2 * | 6/2008 | Regone et al. | 367/16 |
| 2004/0013037 A1 * | 1/2004 | Vaage | 367/21 |
| 2006/0155476 A1 * | 7/2006 | Abma | 702/14 |
| 2006/0155477 A1 * | 7/2006 | Matson et al. | 702/14 |
| 2007/0159921 A1 * | 7/2007 | Regone et al. | 367/15 |
| 2008/0137476 A1 * | 6/2008 | Eick et al. | 367/38 |
| 2009/0116337 A1 * | 5/2009 | Chiu et al. | 367/41 |
| 2009/0292476 A1 * | 11/2009 | Abma | 702/16 |
| 2010/0020640 A1 * | 1/2010 | Eick et al. | 367/38 |
| 2010/0020641 A1 * | 1/2010 | Eick et al. | 367/38 |
| 2010/0039894 A1 | 2/2010 | Abma | |
| 2010/0103772 A1 * | 4/2010 | Eick et al. | 367/21 |

(Continued)

FOREIGN PATENT DOCUMENTS

GB 2390902 A 1/2004

OTHER PUBLICATIONS

International Search Report and the Written Opinion of the International Searching Authority, or the Declaration, issued for International Application No. PCT/US2011/046293 mailed on Oct. 22, 2012.
Ray Abma et al. "Separating Simultaneous Sources by Inversion", Colorado School of Mines, 71st EAGE Conference & Exhibition, Jun. 11, 2009, Amsterdam, The Netherlands, 5 pages.

(Continued)

*Primary Examiner* — Isam Alsomiri
*Assistant Examiner* — James Hulka
(74) *Attorney, Agent, or Firm* — Gunnar Heinisch

(57) ABSTRACT

This is a method of acquiring marine wide azimuth towed streamer seismic data. Preferably, a recording boat which tows a plurality of seismic streamers and at least one source may be accompanied by a plurality of source boats that each tow at least one source. The source boats may preferably activate their respective sources such that the subsurface reflections generated by each source interfere. The time separation between successive shots may preferably be a random variable related to the lowest frequency of interest in the data. Additionally, the source boats may preferably be alternatively fired from the head and tail of the recording streamers.

17 Claims, 7 Drawing Sheets

(56) References Cited

U.S. PATENT DOCUMENTS

| | | | |
|---|---|---|---|
| 2010/0103773 A1* | 4/2010 | Chiu et al. | 367/41 |
| 2010/0299070 A1* | 11/2010 | Abma | 702/14 |
| 2012/0147699 A1* | 6/2012 | Dellinger et al. | 367/15 |
| 2012/0147701 A1* | 6/2012 | Ross et al. | 367/23 |
| 2012/0176861 A1* | 7/2012 | Abma et al. | 367/21 |

OTHER PUBLICATIONS

Ozdogan Yilmaz, "Seismic Data Processing", Society of Exploration of Geophysicists, 1987, Chapter 1, pp. 9-80, Tulsa, Oklahoma, USA.

Ozdogan Yilmaz, "Seismic Data Processing", Society of Exploration of Geophysicists, 1987, Chapter 6, pp. 384-427, Tulsa, Oklahoma, USA.

* cited by examiner

METHOD AND APPARATUS FOR MARINE WIDE AZIMUTH TOWED STEAMER SEISMIC ACQUISITION

RELATED CASE

This application claims the benefit of U.S. Provisional Patent Application Ser. No. 61/369,912 filed on Aug. 2, 2010, and incorporates said provisional application by reference into this disclosure in its entirety for all purposes as if fully set out at this point.

TECHNICAL FIELD

This invention relates to the general subject of seismic exploration and, in particular, to methods for estimating seismic and other signals that are representative of the subsurface.

BACKGROUND OF THE INVENTION

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth, is reflected, and, upon its return, is recorded at a great many locations on the surface. Multiple source/recording combinations are then combined to create a near continuous profile of the subsurface that can extend for many miles. In a two-dimensional (2-D) seismic survey, the recording locations are generally laid out along a single line, whereas in a three dimensional (3-D) survey the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area. In reality, though, both 2-D and 3-D surveys interrogate some volume of earth lying beneath the area covered by the survey. Finally, a 4-D (or time-lapse) survey is one that is taken over the same subsurface target at two or more different times. This might be done for many reasons but often it is done to measure changes in subsurface reflectivity over time which might be caused by, for example, the progress of a fire flood, movement of a gas/oil or oil/water contact, etc. Obviously, if successive images of the subsurface are compared any changes that are observed (assuming differences in the source signature, receivers, recorders, ambient noise conditions, etc., are accounted for) may be attributable to the progress of the subsurface processes that is at work.

A seismic survey is composed of a very large number of individual seismic recordings or traces. In a typical 2-D survey, there may usually be several tens of thousands of traces, whereas in a 3-D survey the number of individual traces may run into the multiple millions of traces. Chapter 1, pages 9-89, of *Seismic Data Processing* by Ozdogan Yilmaz, Society of Exploration Geophysicists, 1987, contains general information relating to conventional 2-D processing and that disclosure is incorporated herein by reference. General background information pertaining to 3-D data acquisition and processing may be found in Chapter 6, pages 384-427, of Yilmaz, the disclosure of which is also incorporated herein by reference.

A seismic trace is a digital recording of the acoustic energy reflecting from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface. Many variations of the conventional source-receiver arrangement are used in practice, e.g. VSP (vertical seismic profiles) surveys, ocean bottom surveys, etc. Further, the surface location of every trace in a seismic survey is carefully tracked and is generally made a part of the trace itself (as part of the trace header information). This allows the seismic information contained within the traces to be later correlated with specific surface and subsurface locations, thereby providing a means for posting and contouring seismic data—and attributes extracted therefrom—on a map (i.e., "mapping").

The data in a 3-D survey are amenable to viewing in a number of different ways. First, horizontal "constant time slices" may be extracted from a stacked or unstacked seismic volume by collecting all of the digital samples that occur at the same travel time. This operation results in a horizontal 2-D plane of seismic data. By animating a series of 2-D planes it is possible for the interpreter to pan through the volume, giving the impression that successive layers are being stripped away so that the information that lies underneath may be observed. Similarly, a vertical plane of seismic data may be taken at an arbitrary azimuth through the volume by collecting and displaying the seismic traces that lie along a particular line. This operation, in effect, extracts an individual 2-D seismic line from within the 3-D data volume. It should also be noted that a 3-D dataset can be thought of as being made up of a 5-D data set that has been reduced in dimensionality by stacking it into a 3-D image. The dimensions are typically time (or depth "z"), "x" (e.g., North-South), "y" (e.g., East-West), source-receiver offset in the x direction, and source-receiver offset in the y direction. While the examples here may focus on the 2-D and 3-D cases, the extension of the process to four or five dimensions is straightforward.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets.

Of course, one well-known problem with seismic data is that it is relatively expensive to acquire. Indeed, in some cases the cost of the survey may determine whether or not the economics of the proposed target are favorable. Thus, techniques that tend to reduce the cost of such surveys are always welcome.

Closely spaced firing of two or more sources has long been recognized as one strategy for reducing the cost of seismic data acquisition. The basic idea behind this approach is that a receiver line or patch may be deployed and that multiple sources may be sequentially activated during a single recording period. Thus, subsurface reflections from an early source excitation may be comingled with those that have been sourced later, i.e., a "blended source" survey is acquired. Note that this is in stark contrast to conventional surveying techniques, wherein the returning subsurface reflections from one source would never be allowed to overlap the reflections of another.

Although the blended source approach has the potential to dramatically reduce the time in the field, thereby reducing the cost of the survey proportionally, one obvious problem is that it can be difficult to separate the individual shots thereafter. Said another way, what is of critical importance in interpreting seismic data is the depth of each reflector. Generally speaking, depth of a reflector is determined by reference to its two-way seismic travel time. So, in a multiple source survey it is of the highest priority to determine which of the observed subsurface reflections is associated with each source, otherwise its two-wave travel time cannot be reliably determined.

On land, it is becoming more common to see blended source survey methods utilized. In most land cases, when vibrators are used the blended source surveys obtained thereby it is not unusual for the "natural" time spacing to introduce some aspect of randomness into the time intervals between source activations. That is, it has previously determined that better separation results may be obtained in blended source surveys where the source activation time separations are random or nearly so (see, e.g., U.S. Provisional Patent Application Ser. No. 61/089,363 filed on Aug. 15, 2008, and U.S. Provisional Patent Application Ser. No. 61/154,613, filed Feb. 23, 2009, the disclosures of which are incorporated herein by reference in their entireties for all purposes as if fully set out at this point). For land data, having the vibrators activate "on position" (i.e., activating the source when the vibrator(s) reach the designated map coordinates of the next shot) introduces some aspect of randomness into the acquisition process.

The same might be said for surveys that utilize ocean bottom seismometers (i.e., "OBS") in that the time that it takes to move from shot point to shot point may vary depending on the wave height, wind direction, current, etc. With an OBS survey, the receivers are stationary and typically the source activations are intended to be at specific locations relative to the receivers. The time required to get the boat into position for each shot thus tends to introduce some amount of randomness in the travel time between successive shots and, hence, to the shot separation.

However, a typical wide-azimuth towed streamer survey ("WATS") tends to produce very regularly spaced shots with near constant time separations therebetween. Since the receivers are pulled along behind the boat the source activation can take place at any time—there is no need to delay until the source reaches a predetermined location. Activating the source at regular intervals is typically expected in such surveys and, to the extent that the ship's motion is relatively constant the timing between successive shots may tend to be equispaced and, indeed, that sort of shot spacing (i.e., equispaced) is generally preferred for purposes of subsurface imaging. However, this arrangement can, of course, make it more difficult to separate blended source data and that is especially true where the time-spacing between shots is comparable to the dominant (or lowest) wavelength (or a multiple of same) of interest in the seismic data. Preferably the expected variation of the shots from a regular interval should be at least one or more of such wave-lengths.

Thus, relying on the natural time separation between shots to introduce randomness into the acquisition process of blended source marine surveys may result in data sets that are hard to separate.

Heretofore, as is well known in the seismic processing and seismic interpretation arts, there has been a need for a method of separating two or more seismic sources that have been activated during a single recording during a WATS survey. Accordingly, it should now be recognized, as was recognized by the present inventor, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains may be able to devise other forms of this invention within the ambit of the appended claims.

SUMMARY OF THE INVENTION

According to an embodiment, there is provided a system and method for separating multiple seismic sources that have been activated during a single seismic recording. In particular, the method allows a user to separates sources acquired with recording of the reflectors overlapped in time. The use of more than one set of sources may allow seismic surveys to be acquired faster if the reflections resulting from the different sources can be separated. This method may be especially effective with acquisition of wide-azimuth surveys, since the kinematics of the reflectors may be significantly different for different shots, allowing the continuity of the reflections to be used in several dimensions.

With respect to marine surveys in particular, according to an aspect of the instant invention a wide azimuth blended source survey that utilizes at least two different sources may be conducted by using two shots (i.e., source activations) that overlap in time. Preferably, the two shots may be located at opposite ends of the towed streamer. Further, and preferably, the overlapping shots may be separated spatially as much as is feasible pursuant to the survey plan.

After the survey has been acquired the overlapping shots may be separated using an inversion-type method.

Additionally, in some embodiments, the sources may be initiated (e.g., fired) at random times while multiple receivers are being recorded. These random delays tend to make the interference between different sources incoherent while the reflections associated with the same source create coherent events. This method has the potential to allow seismic surveys to be acquired faster and cheaper than has been heretofore possible.

In one embodiment, a method of seismic exploration involves positioning a seismic receiver boat at a first location proximate to a subsurface target. The seismic receiver boat may be pulling at least one seismic streamer therebehind and the seismic streamer(s) may have a head end proximate to said receiver boat and a trailing end remote from said receiver boat; positioning a first seismic source proximate to either the head end of said plurality of seismic streamer(s) or said trailing end of said plurality of seismic streamer(s); positioning a second seismic source proximate an opposite end of said plurality of seismic streamer(s) from said first seismic source; activating the first seismic source; waiting a random length of time following the first seismic source activation and then activating the second seismic source where the random length of time is selected such that recorded seismic energy from said second source activation interferes with recorded seismic energy from the first source activation; recording reflected seismic energy from the activation of the first seismic source and from the activation of the second seismic source via the seismic streamer(s), thereby obtaining a plurality of seismic traces that record at least said first and second seismic source activations; performing these steps a plurality of times at a plurality of different locations proximate to the subsurface region, thereby obtaining a blended source seismic survey comprised of a plurality of source activations; and, using said blended source seismic survey to explore for hydrocarbons within said region of the subsurface.

Acquiring seismic data with shots where the recorded information from one shot overlaps in time with other shots has the potential to significantly reduce the time (and cost) required to shoot a seismic survey. This approach might also allow more closely spaced shot point intervals (e.g., during a marine survey) that could potentially provide better seismic images that would improve the chances of discovering economic quantities of oil and/or gas.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages may become apparent upon reading the following detailed description and upon reference to the drawings in which.

DETAILED DESCRIPTION

Figure 1:
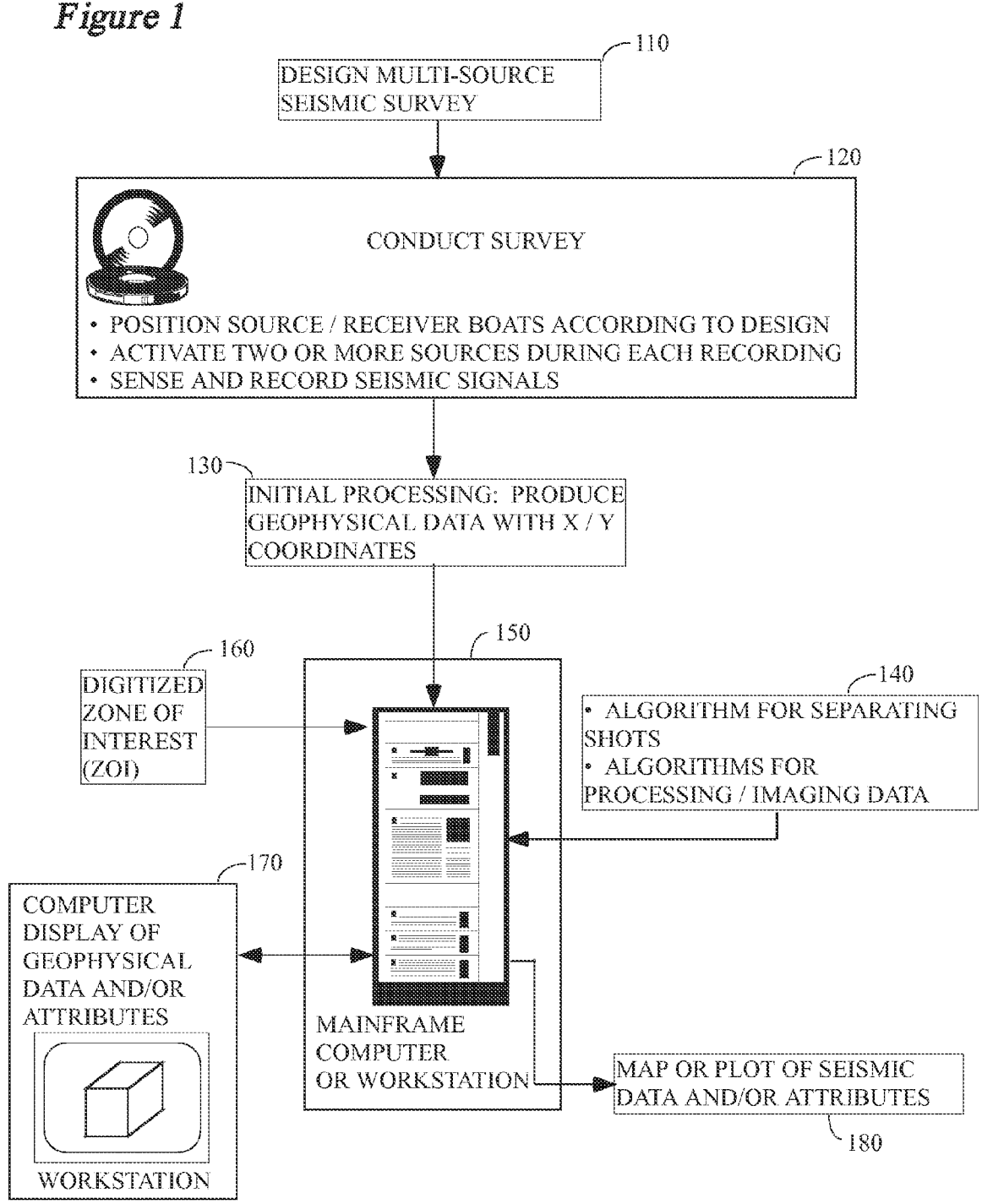
FIG. 1 illustrates the general environment of the instant invention.

While this invention is susceptible of embodiment in many different forms, there is shown in the drawings, and may herein be described hereinafter in detail, some specific embodiments of the instant invention. It should be understood, however, that the present disclosure is to be considered an exemplification of the principles of the invention and is not intended to limit the invention to the specific embodiments or algorithms so described.

General Environment of the Invention

FIG. 1 illustrates the general environment in which the instant invention would typically be used. A seismic survey is designed 110 by the explorationist to cover an area of economic interest. Field acquisition parameters (e.g., shot spacing, line spacing, fold, etc.) are typically selected in conjunction with this step, although it is common to modify the ideal design parameters slightly (or substantially) in the field to accommodate the realities of conducting the survey.

Seismic data (i.e., seismic traces) are collected in the field 120 over a subsurface target of potential economic importance and are typically sent thereafter to a processing center 150 where the traces may be subjected to various algorithms to make them more suitable for use in exploration. In some cases, there may be some amount of initial data processing performed while the data are still in the field and this is becoming more common and feasible given the computing power that is available to field crews.

In the processing center a variety of preparatory processes 130 are typically applied to the seismic traces to make them ready for use by the explorationist. The processed traces would then be made available for use by the instant invention and might be stored, by way of example only, on hard disk, magnetic tape, magneto-optical disk, DVD disk, or other mass storage means.

The methods disclosed herein would best be implemented in the form of a computer program 140 that has been loaded onto a programmable computer 150 where it is accessible by a seismic interpreter or processor. Note that a computer 150 suitable for use with the instant invention would typically include, in addition to mainframes, servers, and workstations, super computers and, more generally, a computer or network of computers that provide for parallel and massively parallel computations, wherein the computational load is distributed between two or more processors. Further, and for purposes of the instant disclosure, the term "computer" should be broadly construed to include any programmable device (or combination of same) including one or more CPUs, microprocessors, microcontrollers, gate arrays, programmable logic devices, etc. The programmable devices that comprise a computer might all be resident within the same housing or they might be widely distributed and electronically interconnected via local area networks, wide area networks (to include the Internet), etc. For purposes of the instant disclosure, the use of the singular "computer" should be understood to also include the plural "computers" and use of the plural should also be understood to include the singular.

As is also illustrated in FIG. 1, in the preferred arrangement some sort of digitized zone of interest model 160 may be specified by the user and provided as input to the processing computer program. In the case of a 3-D seismic section, the zone of interest model 160 would typically include specifics as to the lateral extent and thickness (which might be variable and could be measured in time, depth, frequency, etc.) of a subsurface target. The exact means by which such zones are created, picked, digitized, stored, and later read during program execution is unimportant to the instant invention and those skilled in the art may recognize that this might be done any number of ways.

A program 140 embodying the instant invention might be conveyed into the computer that is to execute it by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network. In a typical seismic processing environment, the methods of the instant invention would be made part of a larger package of software modules that is designed to perform many of the processing steps listed in FIG. 2. After processing by the instant methods, the resulting traces would then typically be sorted into gathers, stacked, and displayed either at a high resolution color computer monitor 170 or in hard-copy form as a printed seismic section or a map 180. The seismic interpreter would then use the displayed images to assist him or her in identifying subsurface features conducive to the generation, migration, or accumulation of hydrocarbons.

Figure 2:
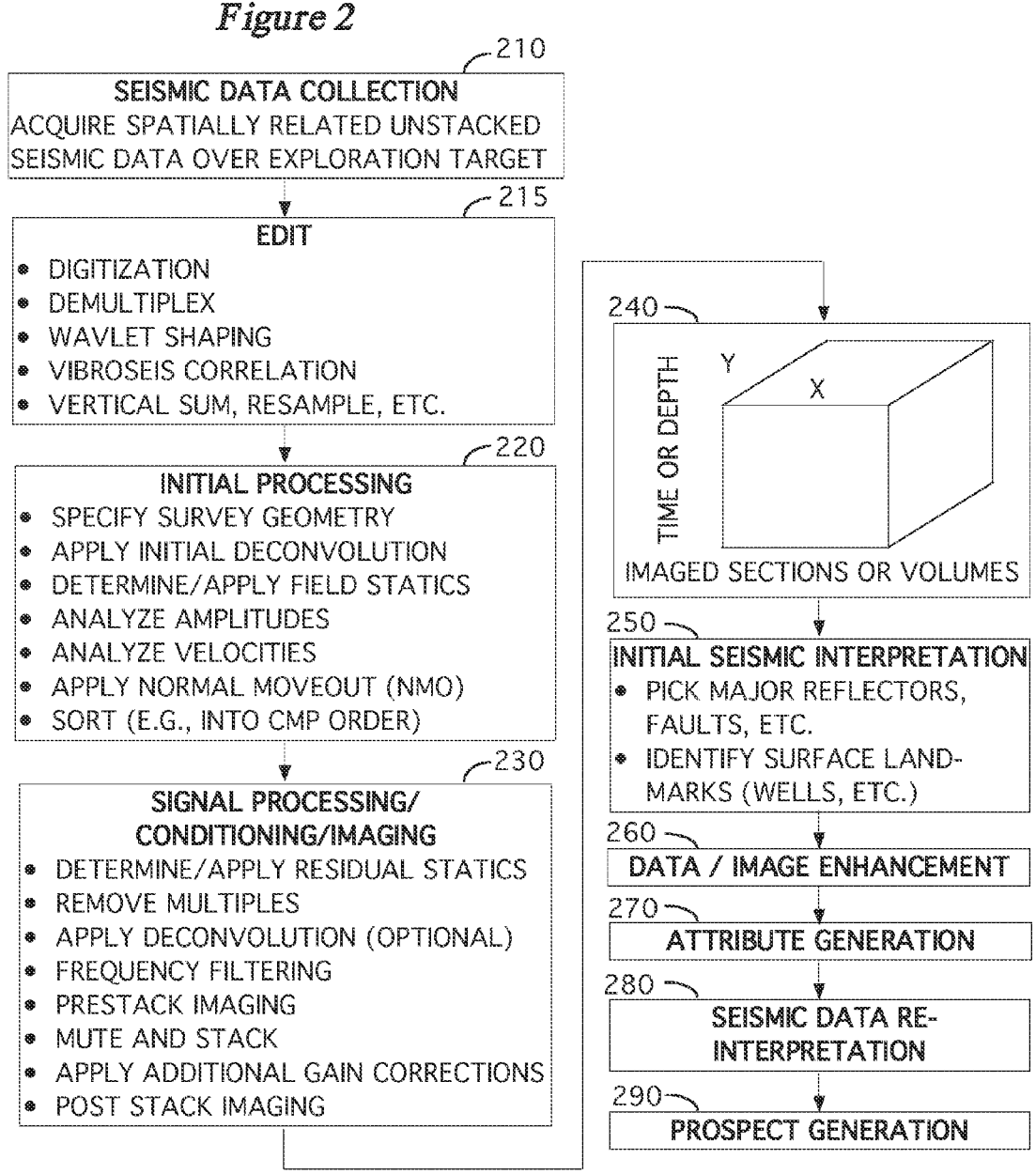
FIG. 2 illustrates a seismic processing sequence suitable for use with the instant invention.

As was indicated previously, the instant invention may preferably be made a part of and incorporated into a conventional seismic processing sequence of the sort generally described in FIG. 2. Those of ordinary skill in the art may recognize that the processing steps illustrated in FIG. 2 are only broadly representative of the sorts of processes that might be applied to such data and the choice and order of the processing steps, and the particular algorithms involved, may vary markedly depending on the individual seismic processor, the signal source (dynamite, vibrator, etc.), the survey location (land, sea, etc.) of the data, the company that processes the data, etc.

As a first step, and as is generally illustrated in FIG. 2, a 2-D or 3-D seismic survey is conducted over a particular volume of the earth's subsurface (step 210). The data collected in the field consist of unstacked (i.e., unsummed) seismic traces which contain digital information representative of the volume of the earth lying beneath the survey. Methods by which such data are obtained and processed into a form suitable for use by seismic processors and interpreters are well known to those of ordinary skill in the art. The seismic survey may be a blended source survey wherein reflections from a later source activation may interfere with (or coincide in time with) reflections from an earlier one. After the shots have been separated according to the instant invention, the unstacked seismic traces resulting from that operation are useable as would be any other collection of seismic traces.

The purpose of a seismic survey is to acquire a collection of spatially related seismic traces over a subsurface target of some potential economic importance. Data that are suitable for analysis by the methods disclosed herein might consist of, for purposes of illustration only, an unstacked 2-D seismic line, an unstacked 2-D seismic line extracted from a 3-D seismic survey or, preferably, an unstacked 3-D portion of a 3-D seismic survey. The invention disclosed herein is most effective when applied to a group of stacked seismic traces that have an underlying spatial relationship with respect to some subsurface geological feature. Again for purposes of illustration only, the discussion that follows may be couched in terms of traces contained within a 3-D survey (stacked or unstacked as the discussion warrants), although any assembled group of spatially related seismic traces could conceivably be used.

Figure 11:
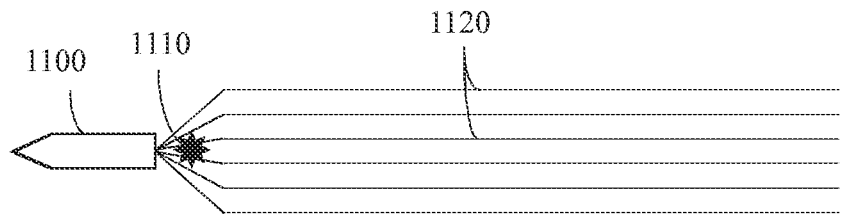
FIG. 11 illustrates a prior art towed streamer marine survey configuration.

In the case of marine seismic, such data are typically acquired via a towed streamer survey. As is generally indicated in FIG. 11, in a conventional arrangement a vessel 1100 tows several hydrophone cables 1120 behind it (i.e., several "streamers" in the argot of the trade) as it travels over a subsurface area of interest. Each streamer 1120 may typically contain several hundred hydrophones which are designed to sense seismic signals that have been reflected from subsurface rock formations and other density contrasts.

At periodic intervals, a seismic source 1110 (that is typically also towed by that same vessel and located directly behind it) is activated. The source energy propagates downward through the water and penetrates into the ocean bottom, where it is ultimately encounters subsurface rock formations that reflect part of the down going energy back up toward the receivers. Note that, although FIG. 11 contains a single graphic element that represents the seismic source 1110, those of ordinary skill in the art may recognize that it is common to utilize more seismic sources (e.g., an array) that activate simultaneously. Recordings are made of the signals that are received by the streamer 1120 hydrophones for a short period of time after the source is activated (e.g. for 10 to 20 seconds) at a sample interval that is typically selected by the explorationist.

After the seismic data are acquired (step 210), they are typically taken to a processing center where some initial or preparatory processing steps are applied to them. As is illustrated in FIG. 2, a common early step 215 is designed to edit the input seismic data in preparation for subsequent processing (e.g., demux, gain recovery, wavelet shaping, bad trace removal, etc.). This might be followed by specification of the geometry of the survey (step 220) and storing of a shot/receiver number and a surface location as part of each seismic trace header. Once the geometry has been specified, it is customary to perform a velocity analysis and apply an NMO (normal move out) correction to correct each trace in time to account for signal arrival time delays caused by offset.

In some embodiments, the disclosed methods may be utilized in connection with the preprocessing step 215, i.e., in conjunction with or in place of the wavelet shaping/Vibroseis® correlation steps, although it could certainly be utilized elsewhere within this generalized processing scheme.

After the initial pre-stack processing is completed, it is customary to condition the seismic signal on the unstacked seismic traces before creating stacked (or summed) data volumes (step 230). In FIG. 2 step 230 contains a typical "Signal Processing/Conditioning/Imaging" processing sequence, but those skilled in the art may recognize that many alternative processes could be used in place of the ones listed in the figure. In any case, the ultimate goal from the standpoint of the explorationist is the production of a stacked seismic volume or, in the case of 2-D data, a stacked seismic line for use in the exploration for hydrocarbons within the subsurface of the earth.

As is further suggested in FIG. 2, any digital sample within a stacked seismic volume is uniquely identified by a (X, Y, TIME) triplet, with the X and Y coordinates representing some position on the surface of the earth, and the time coordinate measuring a recorded arrival time within the seismic trace (step 240). For purposes of specificity, it may be assumed that the X direction corresponds to the "in-line" direction, and the Y measurement corresponds to the "cross-line" direction, as the terms "in-line" and "cross-line" are generally understood in the art. Although time is a common vertical axis unit, those skilled in the art understand that other units are certainly possible might include, for example, depth or frequency. Additionally, it is well known to those skilled in the art that it is possible to convert seismic traces from one axis unit (e.g., time) to another (e.g., depth) using standard mathematical conversion techniques.

An initial interpretation 250 may be performed of the resulting stacked volume, wherein he or she locates and identifies the principal reflectors and faults wherever they occur in the data set. This might be followed by additional data enhancement 260 of the stacked or unstacked seismic data and/or attribute generation (step 270) therefrom. In many cases the explorationist may revisit his or her original interpretation in light of the additional information obtained from the data enhancement and attribute generation steps (step 280). As a final step, the explorationist may typically use information gleaned from the seismic data together with other sorts of data (magnetic surveys, gravity surveys, LANDSAT data, regional geological studies, well logs, well cores, etc.) to locate subsurface structural or stratigraphic features conducive to the generation, accumulation, or migration of hydrocarbons (i.e., prospect generation 290).

Embodiments

According to an embodiment, there is provided a method of acquiring a blended source wide azimuth marine seismic data that utilizes a plurality of marine sources that are positioned at separated locations and that are activated at time intervals that are at least approximately random or pseudo-random. As used herein, the term "pseudo-random" may refer to a value that is randomly generated or determined, yet constrained by set of initial values or other mathematical relationship. However, in general, unless otherwise specified, the term "random" may refer to both completely random and/or pseudo-random value generation. After such acquisition, the instant invention teaches how to separate the overlapping shots for use in seismic exploration.

Experience has shown that conventional marine surveys of the sort illustrated in FIG. 11 may not provide the best coverage for imaging purposes in areas of complex geology. One popular alternative to the standard survey is the wide azimuth survey or, a WATS ("wide azimuth towed streamer") survey.

Figure 12:
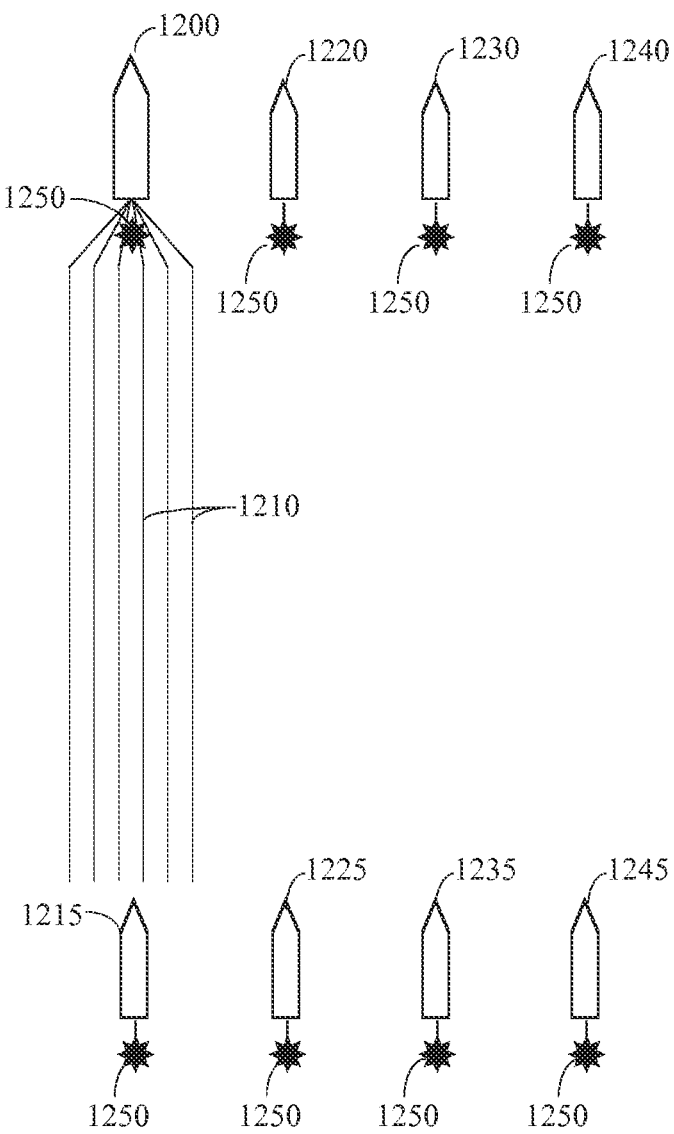
FIG. 12 contains a schematic illustration of a preferred WATS survey configuration according to the instant invention

A WATS survey is designed to acquire seismic data from different (i.e., wider) angles or azimuths than would be available from a traditional marine survey of the sort illustrated in FIG. 11. A schematic of such a survey that would be appropriate for use with the instant invention is presented in FIG. 12. In this figure, a recording vessel 1200 pulls one or more seismic streamers 1210 as is conventionally done in a marine survey. In some cases, the towing vessel 1200 may additionally pull one or more sources 1250 behind it. Additionally, one or more separate source vessels may steam alongside, ahead, or behind the towed streamers 1210. In accordance with the instant invention, at least one source boat may be ahead of the streamers 1210 (i.e., boats 1220, 1230, and 1240 in FIG. 12) and at least one source boat may be behind the streamers 1210 (i.e., boats 1215, 1225, 1235, and 1245). This arrangement is illustrated schematically by the seven shooting boats 1215-1245 in this figure.

It should be noted that prior art WATS surveys typically utilize only sources pulled by boats 1200, 1220, 1230, and 1240 (i.e., boats that are ahead of or parallel with the receiver ship 1200). Thus, in the prior art two passes over the survey area would be required to get offsets in both directions (i.e., shots fired from boats proximate to the head of the streamer 1210 and shots fired proximate to its remote end). However, the instant invention utilizes at least one boat that travels ahead of or alongside of the leading edge of the streamer and another that is behind it. Additionally, of course, there may be other boats that are ahead, behind, or alongside the streamer.

Although some embodiments utilize multiple shooting boats, those of ordinary skill in the art may recognize that a single shooting boat could be used to obtain the same coverage by taking multiple passes through the survey area, with the shooting boat being moved relative to the recording boat 1200 each pass (e.g., during a first pass the shot boat may be at the head of the streamer 1210 and during a second pass over the same area the shot boat may be proximate to the tail of the streamer 1210). However, such an approach would be extremely time consuming and correspondingly expensive.

Additionally, it should be noted that although in this figure the seismic sources are all labeled as 1250, in reality there is no particular reason that the number or type of sources towed behind each boat would have to be identical, although that is generally preferred. Further to that point, and as has been described previously, although each source boat 1215-1245 is illustrated as towing a single source 1250, it should be understood that the source 1250 could potentially represent more than one seismic source that is being towed behind the same source boat (e.g., where a marine array of air guns is utilized) and the type of sources utilized could very from boat-to-boat and/or a single boat might tow more than one type of marine source. Thus, for purposes of the instant disclosure when "source" or "seismic source" or similar language is utilized, those terms should be understood to mean one or more different sources that are intended to be activated simultaneously.

In operation, the recording ship 1200, and the shooting boats 1215-1245 may typically steam together back and forth across a designated survey area, with each pass producing a strip (3D section) of seismic data. Subsequent processing which may typically be done in the processing center may combine the different passes into a single 3D dataset.

Figure 9:
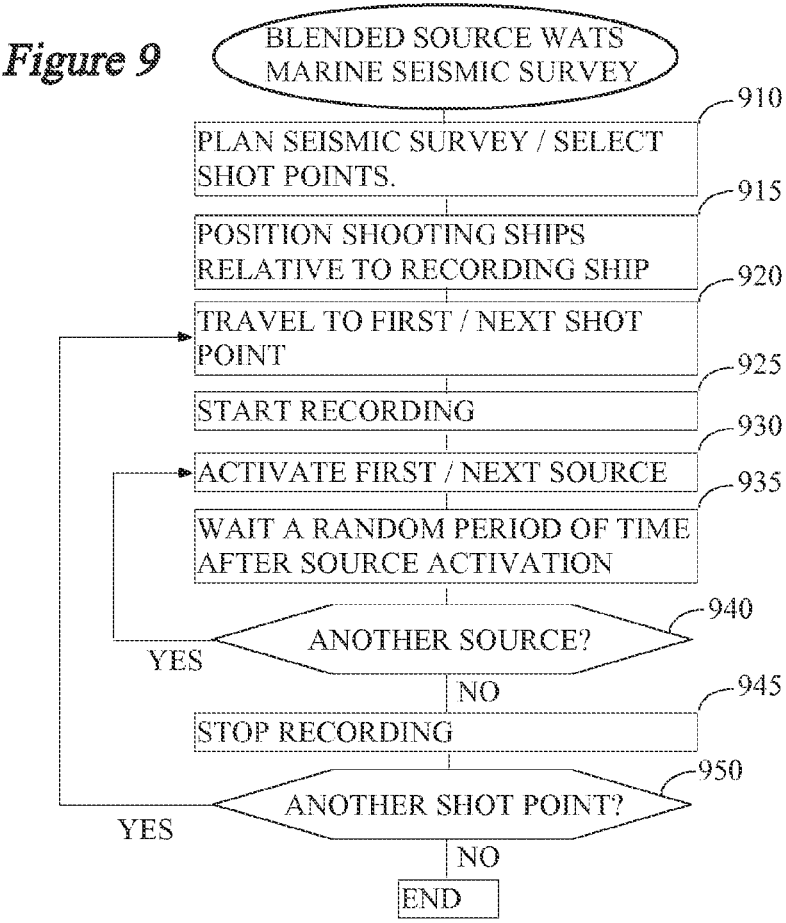
FIG. 9 contains a preferred operating logic suitable for use with the instant invention.

Finally, and turning now to FIG. 9, according to a preferred aspect of the instant a blended source WATS marine seismic survey may be acquired as is generally indicated in this figure. At 910, the survey may be planned and a number of shot points selected. Those of ordinary skill in the art may recognize that the shot points may be located in such a way as to ensure coverage of potential or actual subsurface target or targets.

The survey design may be communicated to the ships that are to implement it and they may be moved into position at the first shot point (step 920). When the ships are proximate to the first shot point, a recording may be initiated (step 925) and the first source activated (step 930). A random period of time may be allowed to pass after the first source activation (step 935) and then a second source may be activated (step 940 and the "YES" branch of decision item 940). After the second (third, etc.) source activation a random period of time may be allowed to pass before the third (fourth, etc.) source is activated. Note that preferably the sources that overlap in time may be generated by different source but that is not strictly required (e.g., in some instances the same source might be activated again while the signals from its previous activation are still returning). This procedure may continue until all of the sources that are to be activated at the current position have been fired and recorded (i.e., the "NO" branch of decision item 940). In some embodiments, the length of time delay between successive source activations may be chosen so as to avoid the period of the dominant or other wavelength in the data (or a multiple of same, thereby making the two source activations more readily separable.

The ship-board recording may then preferably continue until at least some predetermined period of time has passed since the activation of the last shot (e.g., 10-20 seconds), after which the recording may be stopped (step 945).

If there are additional shot points in the plan, the ships may then preferable move in tandem to the next location (the "YES" branch of decision item 950), otherwise the survey may end.

Although the instant invention can work with more than two overlapping shots, the quality of the data so obtained may not be as good as would be the cases if only two shots overlap. Thus, in one embodiment, and as is discussed in greater detail below, the shooting may be performed in such a way that only two shots overlap at a time. Thus, in the logic of FIG. 9, an additional time separation might be inserted between every other source activation in step 935 to allow returning energy from the previous activation to decay before activating the next one. That being said, there is no per se reason that more than two shots could not be overlapped, thereby speeding up the acquisition further and/or creating a better sampled shot grid.

Further in connection with the foregoing, in one arrangement the two shots that are overlapped may be separated spatially as much as is feasible. For example, in the configuration of FIG. 12 although a pair of boats 1215 and 1240 (i.e. seismic sources) are maximally separated and could be used as an overlapping pair, shots from the remaining boats would then be closer together than would be desired. Accordingly, one or more additional pairs of boats/seismic sources may be positioned where each boat or seismic source in each pair are laterally offset from one another as better illustrated in FIG. 12. As used herein, "laterally offset" or "lateral offset" may refer to the position of boats where each boat/seismic source in a pair is disposed or located not only transversely from one another, but also either behind or in front of each other. The lateral offset positioning of each boat or seismic source in a pair provides the maximum distance between the boats or sources. Thus, in the shooting pattern source activations from boats 1200 and 1235 may be overlapped in time, boats 1220 and 1245 may be overlapped, boats 1230 and 1215 may be overlapped, and boats 1240 and 1225 may be overlapped, etc. However, it is contemplated that any number of boats and any combination of pairs may be used where each boat in a pair is laterally offset from one another. That being said, this variation is only given by way of example and those of ordinary skill in the art may readily be able to devise other patterns.

On the other hand, if only two tiles (i.e., coverage swaths) are being acquired, shots from boats 1200 and 1225 could be paired together along with the pair 1220 and 1215. Similarly, if three tiles are being acquired the pairs 1200/1235, 1220/1215, and 1230/1215 could be used. Those of ordinary skill in the art may readily be able to devise alternative arrangements if it is desired to acquire more tiles.

In still another embodiment, a four-fold blending might be utilized by overlapping shots from boats 1200, 1235, 1230, and 1215, followed by a four-fold overlap of the remaining sources (i.e., 1220, 1245, 1240, and 1225).

In each of the cases discussed above, there may be random or pseudo-random times delays between all overlapping shots.

Figure 3:
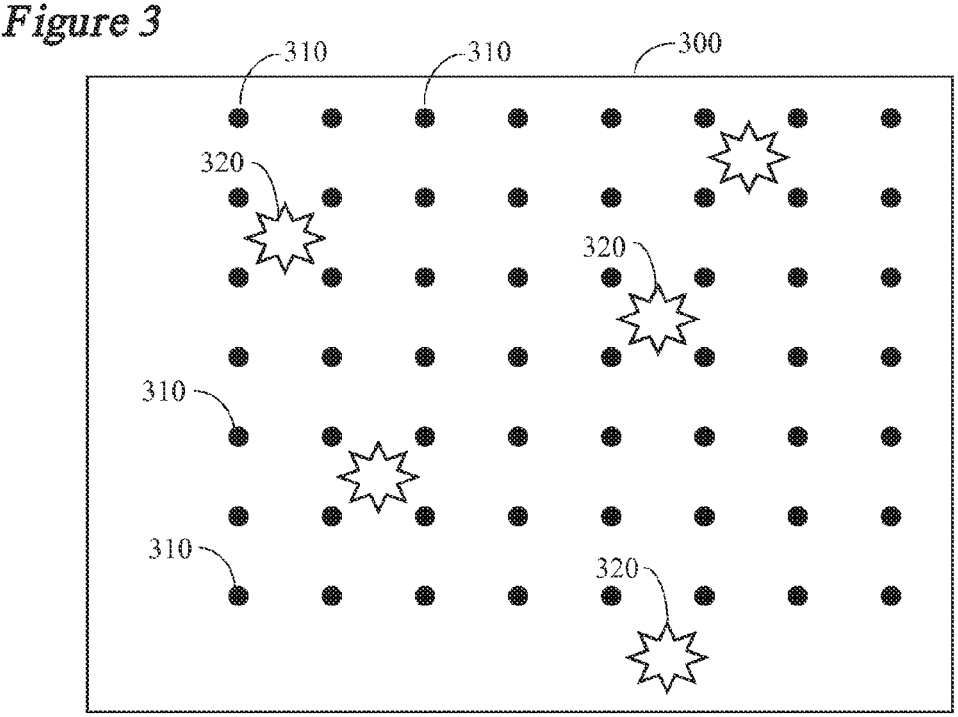
FIG. 3 contains a plan view schematic of a typical blended source survey.
Figure 4:
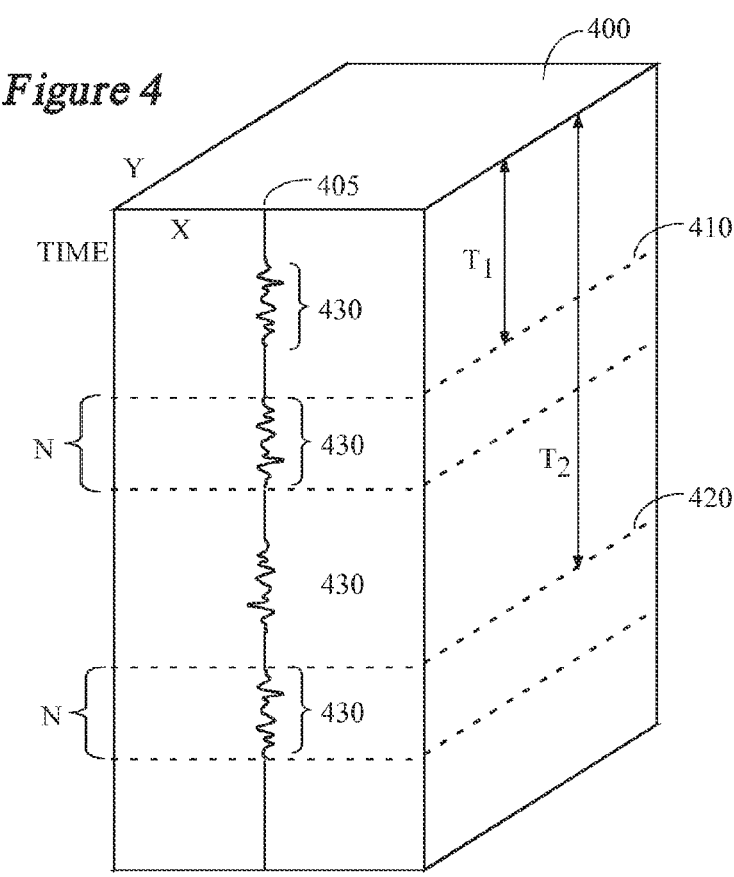
FIG. 4 illustrates schematically how different shots may be identified and extracted within the blended source survey.

Turning next to FIGS. 3 and 4, in another arrangement, a blended source land survey may be collected by first laying out a number of receivers 310 in a 2-D configuration over a target of exploration interest. In some embodiments there may be only a few or as many as several thousand receivers 310 in the survey. The receivers 310 might be connected by cables to a central recording unit, they might use wireless transmission to same, or each receiver might contain some amount of internal data storage in which to record the seismic signals received thereby. Those of ordinary skill in the art may be quite familiar with these sorts of receiver variations.

In this embodiment the receivers 310 may be continuously recorded for an extended period of time. In some variations, the receivers might be recorded for a few hours, one-half day, a full day, multiple days, etc. The only requirement is that the recording must capture the data from at least two overlapping source excitations. This is in contrast to the usual seismic survey, wherein the receivers are recorded for only a few seconds after the activation of a source.

During the time period that the receivers are being recorded, a number of seismic sources 320 may be activated at different locations within the survey area 300. In this embodiment two or more sources may preferably be used. In the case of a marine survey, it two or more sources may be used. Further, the source activations are separated in time by random or pseudo-random time periods. Still further, the sources may be activated close enough in time that there may be some overlap or blending between the shots. That is, for example in the case of a land survey where each source 320 is a Vibroseis® unit, it is anticipated that the source activations might be separated by a few seconds in some cases. Note that FIG. 3 is not intended to suggest that each source 320 may be activated simultaneously but instead is indicated to indicate that each source is located at a different location within the survey area 300. During some surveys, ten or more different sources might be used. As an example an exploration method that would produce data that would be suitable for use with the disclosed methods, attention is drawn to WO 2008/025986 (PCT/GB2007/003280) "Seismic Survey Method", which is incorporated herein by reference as if fully set out at this point. Howe discusses the use of staggered activation of vibrator activations wherein there is some overlap in the returning subsurface reflections.

When the data are acquired in a marine setting, it is preferred that care be taken to make the time intervals between shots as random as possible. More particularly, some amount of randomness may be introduced by shooting on position (i.e., activating the source when the boat reaches a predetermined position) since the exact arrival time at a shot point is at least somewhat random. However, this may not be a reliable way to introduce randomness into the activation times since the boat speeds tends to be relatively constant and the shot points are typically evenly spaced. That being said, shooting exclusively on position may introduce sufficient randomization when the distance between shot points is large. The randomness of the intervals between source activations may preferably be controlled by the lowest frequency of interest in the survey, and the expected variation of the shots from a regular interval should be at least one or more of such wave-lengths. Thus, if the lowest frequency of interest produces a seismic wave with a wavelength that is on the order of 200 ms in length, preferably the shot separation should be on the order of 200 ms plus some random amount which might be, again, on the order of 200 ms or more. Those of ordinary skill in the art may readily understand how to calculate at least an approximate wavelength of a seismic wave in the subsurface given its frequency or, in the case of a complex wave form, its center frequency, width at half amplitude, etc.

Of course, one alternative, i.e., shooting strictly at predetermined times independent of the boat's actual position ("shooting on time"), is likely to run afoul of the imaging goals of a carefully planned survey which typically calls for equally spaced shot locations and, preferably, a 2-D grid of same. As a consequence, a blended approach is preferred.

In some embodiments, randomly spaced shot times and positions may be scheduled, with the shooting boat increasing or decreasing its speed as necessary to be at the chosen location at the assigned time. In other embodiments, the boat may be shooting on position, with the shot times being monitored for randomness. In this scenario, the boat may approach a designated position and then, rather than firing exactly on position, it may add or subtract some amount of time (e.g., a randomly generated time adjustment) to the anticipated arrival time so that the boat intentionally shoots a bit early or late. The time adjustment may be chosen to ensure that the distribution of shot times are at least approximately random. Also, the random increment should be chosen so that the boat is within some specified distance tolerance of the intended shot point. Finally, the increment may be chosen such that the maximum delay does not interfere with the movement of the other sources to the next short position. This might be done, for example, by checking the delay from the last shot to assure that it is not too close to the delay between the previous shots or by keeping track of the distribution of the shot times to check for and correct non-random patterns.

The software that controls the airguns or other seismic sources may be used determine the ship's location (e.g., via GPS), its anticipated arrival time, and the time since the previous shot(s) in order to create a distribution of shot activation times (or shot time intervals) that is at least pseudorandom. Of course, in one embodiment this may be done without allowing more than two shots to overlap. That being said, it is contemplated that multiple shots may overlap.

Turning next to FIG. 4, this figure suggests in a general way what the data from a blended source survey might look like. Each receiver 310 may give rise to a seismic trace (e.g., trace 405) that could potentially be tens of minutes or several hours (or days, etc.) in length. In this figure, the trace 405 is shown schematically as containing recorded signals from four different source excitations 430. For purposes of illustration, the source activations 430 have been depicted as not overlapping although in practice there would likely be at least some overlap between adjacent activations.

Associated with each receiver 310 may be a location on the surface of the earth. When the signals that have been recorded from each receiver 310 are properly arranged and displayed, in one embodiment a 3-D volume may be produced with each receiver 310 being associated with an "X" and a "Y" location surface location, to include locations based on latitude and longitude, etc.

During a blended source survey the time at which each source 320 is activated may be noted and recorded, with the sources being located inside or outside of the receiver field. In FIG. 4, $T_1$ and $T_2$ represent the known times (as measured from an arbitrary zero time) at which two sources were activated, with the parameter "N" indicating in a general way the length of time (number of samples) after the source activation during which reflections from the subsurface from this source might be sensed. In this particular example, and as may be explained in greater detail below, the two source activations are from the same source (e.g., two Vibroseis® sweeps) so they do not overlap in time. In this arrangement, interference may most likely come from other seismic sources that were activated during the time window indicated or that had subsurface reflections arriving during this same time interval. That being said, the instant invention would be applied in the same fashion if the two or more source activations from the same source were to overlap in time.

Turning now to a discussion of the mathematical theory of the instant invention, in a first embodiment the blended source seismic survey may be represented mathematically by the equation:

$$d = \Gamma S m$$

where d is the recorded data of the sort schematically illustrated in FIG. 4, m is the set of desired reflection signals based on source activations that have been fully separated (i.e., the "model" response), S is a matrix or operator that constrains the solution by requiring similarity between nearby shots, and $\Gamma$ is the blending or mixing matrix which describes the activation times of the individual sources. In some embodiments the gamma matrix may consist of zeros and ones that are situated so as to introduce each shot into its appropriate time-location in the data matrix d. Note that S can be any method of constraining the events in nearby shots to be similar or coherent. S is not limited to applications in a single direction but is intended to be applied to the full dimensionality of the acquired data (e.g., 2-D, 3-D, 4-D, etc.). Further, it should not be assumed from the previous equation that S is necessarily a linear operator. Although in some embodiments it may be, in other instances this variable may represent a non-linear operator, or a linearized version of same.

In one embodiment, S represents a fast Fourier transform ("FFT") or a Radon transform. For irregularly spaced shots, S might better be calculated with discrete Fourier transforms or some other method that allows for the irregular sampling of the shots. Those of ordinary skill in the art may understand how such transforms are calculated. A closely related approach would be for S to represent a curvelet transform. As may be understood by those of ordinary skill in the art, the thresholding operation would then be applied to the curvelet coefficients (rather than to the Fourier coefficients as is preferably done in the Fourier transform approach).

In another embodiment, there is provided an invention substantially as described above, but wherein a different equation is inverted in order to separate the blended sources. In this variation, the equation presented above may be left multiplied by gamma transpose to yield:

$$\Gamma d = \Gamma \Gamma S m$$

One advantage of this approach is that data that contains blended sources are often received at the processing center in the form of combed data, where the term "combed data" should be understood to mean data that have been extracted from a continuous recording and organized into shots.

In another embodiment, the blended seismic survey may be represented mathematically by the equation:

$$W d = W \Gamma S m$$

where d, m, S, and $\Gamma$ have the same meanings as were indicated previously, and where the matrix W is an arbitrary weight matrix. One possible use for the matrix W might be to provide a systematic means of dealing with amplitude variations within the survey. For example, in FIG. 3 receivers 310 that are located proximate to a shot 320 may tend to have higher amplitude signals than signals recorded by receivers that are located further away. The W matrix could be used to correct for proximity of the shot to the receiver and to create equal or near equal amplitude traces. Of course, if W is chosen to be an identity matrix, the unweighted system of equations presented previously may be obtained.

Generally speaking, weights and constraints may be useful in improving the quality of the results or in speeding the rate of convergence. For example, requiring the solution to be zero above the time of the first arrivals of a source activation is a natural constraint that might be introduced.

Figure 10:
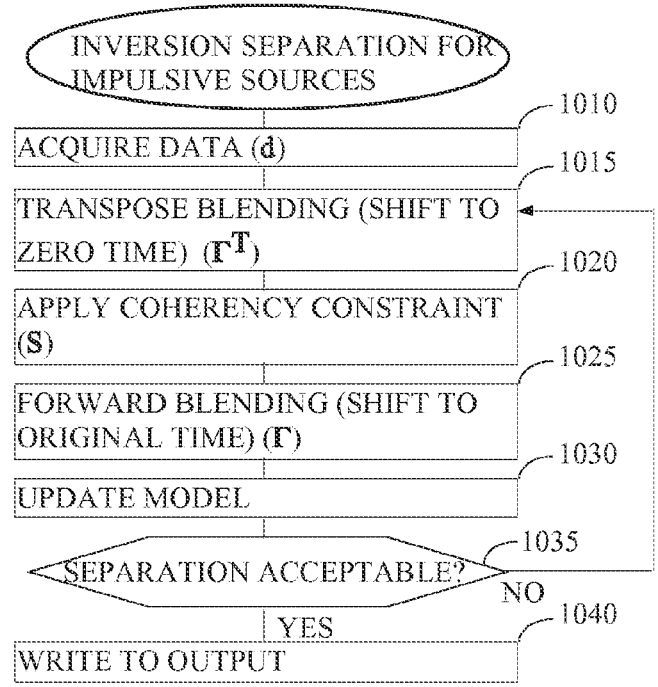
FIG. 10 illustrates a detailed preferred operating logic that would be suitable for use when the source is impulsive.

FIG. 10 contains a high-level operating logic for an embodiment of the instant invention. According to the embodiment taught in this figure, a procedure such as that contained here may preferably be followed when the seismic sources are impulsive (e.g. dynamite or data acquired and correlated with a single common Vibroseis sweep on land, or air guns off shore, etc.). A first preferred step would be to acquire a blended source survey (step 1010). Next, a set of overlapping shots may be selected and the selected shots may preferably be shifted to zero time (step 1015). Next, and preferably, a coherence constraint (step 1020) may be applied to the data as is discussed in greater detail below. Next, the selected shots may preferably be shifted back to their original time and combined together (i.e., the shots may be forward blended—step 1025). The model may then preferably be updated (step 1030) and the preceding process repeated if the separation of the shots is not acceptable (decision item 1035). Otherwise, the separated shots may preferably be written to output (step 1040).

Figure 8:
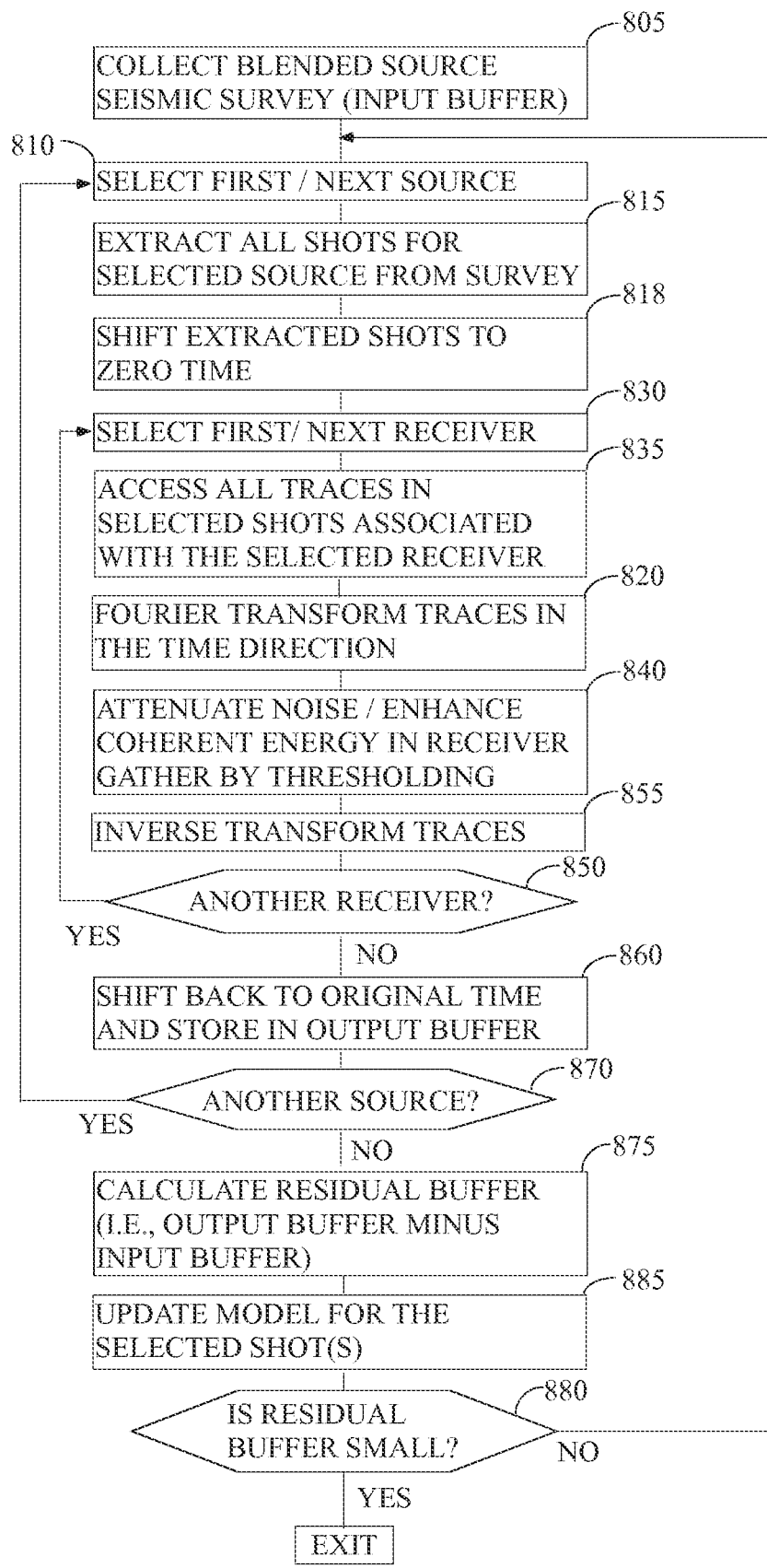
FIG. 8 contains a flowchart of an embodiment of the instant invention.

FIG. 8 contains a more detailed logic suitable for use with the instant invention. One embodiment of the instant invention begins with the collection of a blended source seismic survey according to the procedures discussed previously (step 805). That being said, it should be noted and remembered that there are many ways to design and collect a blended source survey and the examples given above should be not used to limit the range of application of the instant invention. All that is required is that the recorded seismic data contain at least two source activations that have returning reflections (or surface waves, etc.) that overlap in time. Preferably, at least two different sources (e.g., two different vibrators, etc.) may be used for purposes of data collection efficiency. Also, note that the instant method is directly applicable to marine surveys as well. For example, the different sources could be pulled by different boats which all fire into the same geophone streamers. Alternatively, a single source could fire shots in rapid succession, etc. The blended source input data may be conceptualized as being similar to the 3-D dataset of FIG. 4. In one embodiment, a single receiver may be processed to reduce computer memory requirements and to allow parallelization of the method over many receivers.

As a next preferred step, one of the sources (e.g., a particular vibrator, air gun, etc.) may be selected (step 810). Note that, after the first pass through the logic of FIG. 8, subsequent passes may select other sources and the seismic traces and receivers associated therewith.

Next, preferably all of the shots associated with the selected source may be extracted from the input buffer (step 815) and shifted to zero time (step 818). FIG. 4 illustrates conceptually how this might be done. As is indicated in that figure, it should be assumed for purposes of illustration that the chosen source was activated twice at nearby locations: once at time $T_1$ and again at time $T_2$. In such a circumstance, preferably a horizontal (time slice) volume of data may be extracted from the survey 400 beginning at time $T_1$ and continuing for a predetermined period of time thereafter (e.g., 10 seconds) which may include "N" samples. Note, of course, that because of moveout the signals corresponding to the same source activation may appear at different times on different traces depending on their distance from the shot, but correcting for offset travel time is well within the ability of one of ordinary skill in the art. This step may produce a seismic volume that is analogous to that displayed as time slice 410.

Continuing with the previous example, a similar operation may then be performed to produce volume 420 which begins at time $T_2$ which, for purposes of illustration, also includes N samples. Note, of course, that in reality the time extent (number of samples) of each volume might be different (e.g., if a vibrator used one sweep pattern for one source activation and a longer or shorter sweep for another). That being said, for purposes of illustration only it may be assumed that each volume is N samples in duration with N being chosen to include the entirety of the source activation as recorded by receivers located at both near and far offsets. For purposes of clarity in the discussion that follows, these volumes may be referred to as shot gathers or shot records because each contains seismic energy that originates from the selected source excitation. Of course, in a blended source survey energy from other/non-selected source activations would be expected to also be present within each shot gather.

Each shot gather 410/420 may contain a number of individual seismic traces. Further, it should be noted that although only four source activations are shown in FIG. 4, in reality many more such activations would typically be obtained from each source during an actual blended source survey. Finally, note that each of the extracted volumes may typically contain reflections originating from other (non-selected) source activations which may be attenuated via the methods discussed below.

Preferably, as a next step a first or next receiver may be selected (step 830) from among the receivers in the survey (e.g., one of the receivers 310 of FIG. 3), the preferred object being to sequentially process each receiver in the survey in turn.

Figure 5:
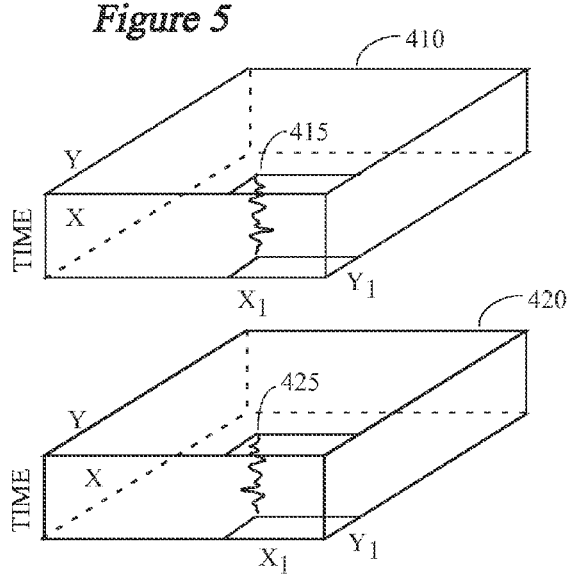
FIG. 5 contains an illustration of how corresponding receiver records may be identified and extracted.
Figure 6:
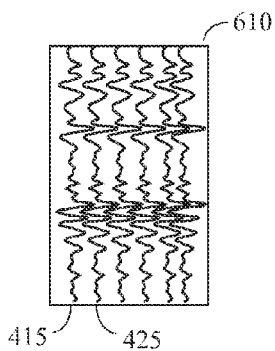
FIG. 6 illustrates a receiver record that is associated with a given source and that has been extracted from its source excitations.

Next, and preferably, all traces in the extracted shot volumes (e.g., shot gathers 410 and 420) that are associated with the chosen receiver may be accessed (step 835). This step is conceptually illustrated in FIG. 5. In this figure, a trace 415 corresponding to the selected receiver $(X_1, Y_1)$ is identified in volume 410 and another trace 425 which was recorded by the same receiver $(X_1, Y_1)$ is identified in volume 420. Preferably the identified traces 415 and 425 may be assembled to form a common receiver gather 610 (see FIG. 6), although those of ordinary skill in the art may recognize that such traces need not be actually be moved together into contiguous memory in order to be operated on as is discussed hereinafter but, instead, might be operated on in place as is often done. Still, the discussion that follows may be made clearer if it is assumed that the traces 415 and 425 have been moved from their original storage location and assembled into a receiver gather 610 as is indicated schematically in FIG. 6.

Next, preferably a coherency constraint may be applied to the selected receiver traces (i.e., steps 820, 840, and 855). Note that, although the preferred coherency constraint involves calculation of a 2D or greater Fourier transform (step 820), thresholding the transform coefficients (step 840), and an inverse Fourier transform (step 855), there are other methods of accomplishing the same end. That is, well known operations such as FX deconvolution, Radon transforms, curvelet transformations, slant stack, median stack/filter, principal component analysis, etc., could alternatively be used to enhance the coherency of the selected traces at the expense of incoherent energy such as noise spikes, reflections from non-selected shots, etc. In view of the fact that FX-decon-like methods are relatively fast to compute they are particularly useful as an alternative to thresholding. Those of ordinary skill in the art may readily appreciate that many operations might potentially be performed on the transformed (or untransformed) data to impose a coherency condition on the extracted blended data, the only requirement being that such an operation must tend to reject any energy that is not coherent from trace to trace and tend to preserve coherent energy, and especially preserve coherent energy that is relatively large in amplitude as compared with the noise.

For purposes of the instant disclosure, applying a threshold to a seismic trace should be interpreted to mean comparing all or some of the digital values in the seismic trace with a predetermined value, i.e., the "threshold". Those values that are greater than the threshold may preferably be left unchanged, whereas those that are less than the threshold may preferably be replaced in the trace by zero or some other, preferably small, constant value.

Note that in some embodiments, the threshold applied may preferably be relatively large for the first few iterations (i.e., only relatively large numerical values may be passed unchanged) and may be reduced toward zero as the iteration count increases, thereby allowing more of the Fourier or Radon coefficients to pass as the process advances. This allows the strongest and most coherent energy to pass in the early iterations, with the weaker and less coherent energy being passed in later iterations. Preferably, in early iterations the threshold may be chosen such that a very small percentage of the transformed data values may be left unchanged (e.g., a few percent), with the remainder set equal to zero. The final iteration(s) may preferably be performed with the threshold equal to zero so that all Fourier or Radon transform values may be passed. In another embodiment the threshold may be set such that about (1−(iter/niter))*100% of the data values are set equal to zero during the "iter" iteration, where "niter" is the projected number of iterations. Thus, if "niter" is 33, then about 97% of the values may be zeroed during the first iteration.

Returning now to step 820, preferably the traces in each extracted receiver volume/gather may be transformed by way of a discrete Fourier transform to produce a Fourier transformed dataset. Typically, this transformation may be implemented via the fast Fourier transform as that term is known to those of ordinary skill in the art. Note that, although an FK transform is preferably used (i.e., a 2D transform), up to a 5-D transform might be used, depending on the coherence criteria that is utilized. Another possible approach would be to use a Radon transform to produce a volume of coefficients used as a coherence criterion.

As a next preferred step 840, the coherent energy in receiver gather 610 may be enhanced at the expense of incoherent energy, preferably by thresholding the seismic data as described previously. Note that this step corresponds conceptually to the application of the matrix S in the previous equations.

Preferably, the thresholded data may now be inverse transformed to the time/offset domain (step 855).

Preferably, a determination may next be made as to whether or not this is the last receiver intended for processing (decision item 850) and, if not, the method may branch back to step 830 and repeat the steps that follow.

In the event that all of the receivers in the selected shot have been processed (the "NO" branch of decision item 850), receiver gathers may be (either in effect or actually) reassembled into a volume.

Figure 7:
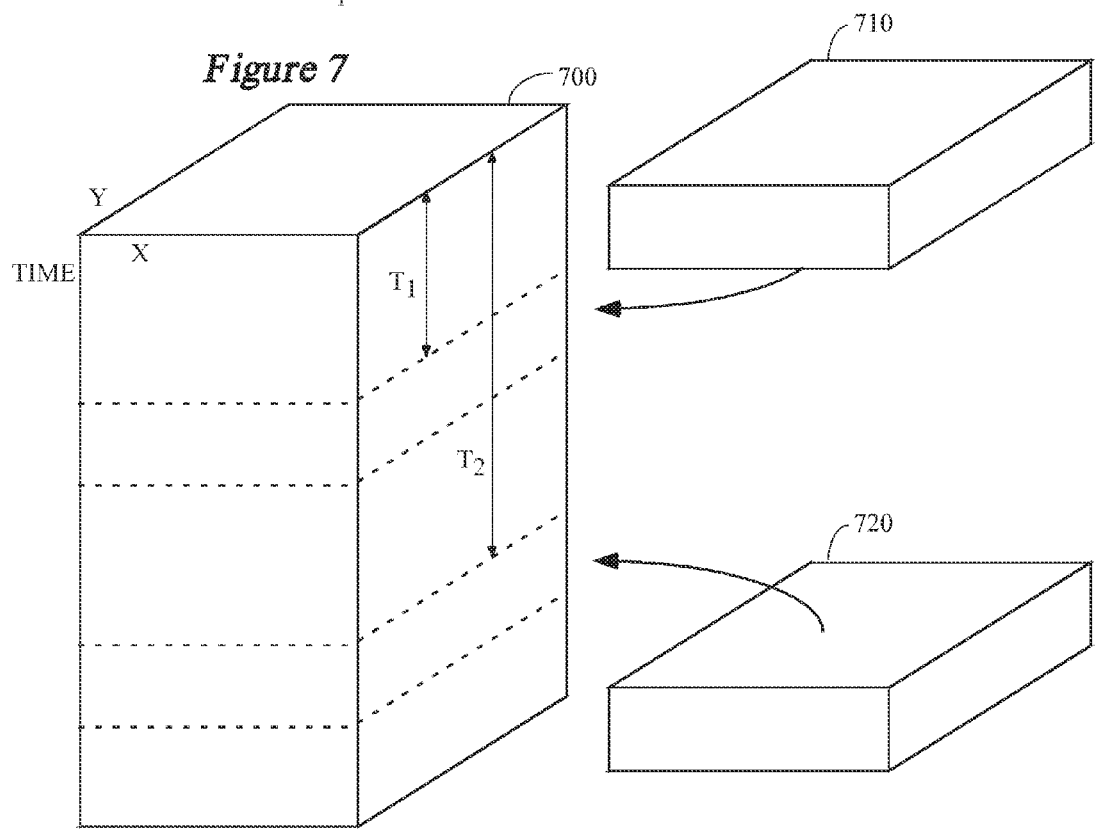
FIG. 7 illustrates schematically how the processed shots for a selected source are shifted in time and stored in the output buffer.

Next, preferably the inverse transformed processed shot records may be time shifted back to their original times (i.e., $T_1$ and $T_2$) and integrated into an output buffer (step 860), preferably via addition thereto. This step corresponds to the application of the gamma matrix (Γ) in the previous equations and is illustrated conceptually by FIG. 7, wherein an output buffer 700, which may typically be the same dimensions as that of the original seismic survey 400, has been prepared to receive the processed shot records 710 and 720. As should be readily understood by those of ordinary skill in the art, the processed shot records 710 and 720 may preferably be summed into the corresponding traces of the output buffer 700.

Preferably, next a determination may be made as to whether or not there are additional sources that are to be processed (decision item 870). If there are one or more sources to be processed, the instant invention may preferably return to step 810, otherwise the instant invention may preferably move to step 875.

As a next preferred step 875, the instant invention may compare the output buffer to the input buffer, preferably by calculating the difference between the two arrays. In terms of the instant example, the processed data 700 (i.e., the seismic response calculated from the current model estimate) may be subtracted from the input data 400, with the difference between the two matrices being referred to as the "residual", hereinafter (step 875).

Now, if the residual (matrix) is in some sense small (decision item 880), where "small" should be understood to be some sort of numerical measure of the size elements within the matrix, the instant invention may preferably stop and the updated output buffer 700 (step 885) containing the separated shots (m) can then be further processed for use in exploration. In one embodiment the iterations may continue until the residuals are equal to zero or very nearly so.

On the other hand, if the previous steps have not produced a satisfactory separation of the shots, the model may be updated (step 885) and another iteration of the foregoing may preferably be performed. In more particular, it is preferable that a conjugate gradient calculation be performed to improve the estimate contained within the output buffer 700. Those of ordinary skill in the art may recognize how this might be calculated using the input buffer (original survey data), the best estimate of the separated shot matrix, and the residual matrix. Of, course, conjugate gradient is just one of many optimization schemes that might be utilized to update the model matrix. For example, conjugate gradient is essentially an L2 (i.e., least squares) approach and alternative norms (e.g., L1) might similarly be used.

In practice, it has been determined that a few hundred (a preferred number is 270) iterations of steps 810 through 880 often yields a satisfactory separation.

According to another embodiment, there is provided a method substantially similar to that taught above, but wherein an alternative method of attenuating the noise and enhancing the coherent energy in nearby shots is used. Preferably step 840 of FIG. 8 may be performed as follows. Preferably, the traces associated with the selected shot/receiver may be transformed to produce a full 4-D transform. That is, a 2-D horizontal transform may be performed on each frequency slice of the 1D transformed extracted seismic traces, which may yield a 3-D transformed shot volume as is well known in the art. This may preferably be followed by a 1D (horizontal) transformation of each common receiver gather of the sort described and assembled in connection with step 835 (and represented schematically by gather 610 of FIG. 6) which has been formed by taking traces from each of the 3-D transformed shot gathers (i.e., volumes analogous to the shot records 410 and 420). The previous operations may have produced a 4-D transformation of the input data associated with the current source. Similarly, the operation may be extended to 5-D by adding another Fourier transform in the other offset direction. Note that although the instant invention was described in terms of a 2-D horizontal transform window above, preferably either a 2-D or 3-D window may be used depending on the circumstances.

Next, and preferably, the 4-D transformed data may be thresholded in the manner discussed previously. That is, in the preferred arrangement some percentage of the smallest (e.g., in complex magnitude) transformed values may be set equal to zero. Of course, other methods of determining the threshold value (e.g., some percentage of the maximum magnitude in the dataset) could also be used and those of ordinary skill in the art may be readily able to devise same. For example, the threshold could be chosen so that the smallest 90% of the values in the 4-D transformed dataset may equal zero, although those of ordinary skill in the art may recognize that the actual percentage used may need to be adjusted up or down on a case by case basis in order to obtain the best results for a particular survey.

Finally, the thresholded data may be subjected to an inverse 4-D transform to return the data to shot gathers in the (X, Y, time) domain, at which point the instant algorithm may preferably continue with step 850.

Note that the foregoing discussion was most appropriate for use with impulsive source data. Modifying the foregoing to work with vibrator data is straightforward. Returning again to FIG. 8, assume for purposes of illustration that one or more of the sources is a seismic vibrator. In that case, a pilot or similar signal may typically be available for each source excitation (i.e., a sweep). As is well known to those of ordinary skill in the art, it is customary to correlate the pilot signal with the data early in the processing sequence. Within the context of FIG. 8, it is preferred that the pilot signal be removed in conjunction with step 815 or step 818. That is, upon selection of a shot for a given source, the pilot signal associated with that shot may preferably be deconvolved (or similarly removed) from the data.

The instant method may then preferably continue unmodified using the data with the source signature removed until step 860 is reached, at which point the pilot signal may preferably be reintroduced into the data (e.g., via convolution) so that the output buffer may contain data that is comparable with the original data traces.

Those of ordinary skill in the art may recognize that other source-specific signature issues could similarly be resolved by removing the signature as indicated above and reintroducing it later prior to blending the processed shot record back into the output buffer.

Finally, the methods taught herein may be thought of as broadly encompassing two approaches: a constructive approach and a deconstructive approach. In the "constructive" approach, the instant method preferably builds the separated seismic signal frequency-by-frequency. In the "deconstructive version" the starting point may preferably be the full (blended) dataset and interfering noise is successively removed until only the fully separated model data remains.

Using the variable definitions presented previously, a preferred minimal operating logic for the constructive version ("Version A") may be expressed be as follows:
 i. m=0
 ii. dp=0
 iii. dr=d−dp
 iv. mp=Γ' dr
 v. m=m+mp
 vi. m'=FFT(m)
 vii. mp'=threshold(m')
 viii. mp=FFT$^{-1}$(mp')
 ix. dp=Γmp
 x. If more iterations are needed, go to (iii).

Similarly, a preferred minimal operating logic for the deconstructive version ("Version B") may be written as follows:
 i. m=0
 ii. d=recorded data
 iii. dm=Γ' d
 iv. dm'=FFT(dm)
 v. mp'=threshold(dm')
 vi. mp=FFT$^{-1}$(mp')
 vii. dp=Γmp
 viii. d=d−dp
 ix. m=m+mp
 x. if more iterations are needed, go to (iii),
where the definitions of these matrices are the same as those presented previously.

For sources with more than one source sweep or source signature, a preferred minimal operating logic similar to the constructive version ("Version A") may be expressed be as follows:
 i. m=0
 ii. dp=0
 iii. dr=d−dp
 iv. mp=Γ' dr
 v. mp=deconvolution of mp to remove each source's signature or sweep
 vi. m=m+mp
 vii. m'=FFT(m)
 viii. mp'=threshold(m')
 ix. mp=FFT$^{-1}$(mp')
 x. mp=convolution of mp with each source's signature or sweep
 xi. dp=Γmp
 xii. If more iterations are needed, go to (iii).

It should be noted that Version A supra_tends to resemble a POCS (i.e., "projection onto convex sets") interpolation in that it constructs the desired output m by iteratively fitting the model m to the data d. Version B is similar, but could also be compared to anti-leakage Fourier transform interpolation in that it deconstructs the recorded data d into the model m until d is zero. Version A might possibly be more robust than Version B since Version A is likely to be more self-correcting. But Version B might allow better separation since it applies the coherency criteria to the residual model instead of the total model. Version B is likely to require computation in double precision, especially when many iterations are needed.

While the conjugate-gradient inversion method taught above is a preferred approach, inversion methods may also be used. In particular, a POCS (Projection Onto Convex Sets) method may be used instead, making the method look more like a signal-processing technique. The constraint that the data from nearby sources should be similar would be one of the constraints required by the POCS method. In other embodiments, a steepest descent or similar gradient descent algorithm could be used in place of conjugate gradient.

Those of ordinary skill in the art may recognize that conjugate gradient (or Weiner-Levinson) methods are L2 in nature. This immediately suggests that it might be useful in some circumstances to minimize an L1 or other norm instead. It is well known, for example, that iteratively reweighted least squares ("IRLS") provides an algorithm for calculating an L1 (or other robust) norm solution to a minimization problem and such might seem preferred in the instant case. However, experience has shown that an L1 approach to solving the inversion equations that is calculated via IRLS may not always give the best result. Using a projection on convex sets ("POCS") approach to obtaining a solution that approaches an L0 solution might be a better way to calculate this quantity in at least some circumstances.

Although the instant invention preferably inverts the survey data by solving a system of equations of the form d=ΓS m, in some embodiments a different approach to separating the source excitations might be taken. For example, in one embodiment the equations solved may be:

$$d=(\Gamma)m, \text{and,}$$

$$0=(S')m,$$

where d is, as before, the blended survey data, Γ is the blending matrix, and S' is a coherency criteria that passes the incoherent part of m, and m is the desired separated data. Although this is not the preferred approach, solving for m may yield the sought-after inverted/separated data.

As further alternatives to the methods of filtering to improve the coherency in the data suggested above, those of ordinary skill in the art may recognize that various Radon transforms, PEFs (i.e., prediction error filters), KL filtering, wavelets, curvelets, seislets, SVDs (i.e., singular value decomposition), are other well known methods of enhancing coherent events that might be used instead of thresholding. In some embodiments the coherency computations may be modified to predict the expected kinematics of m. For example S could be formulated as a dip filter to enhance the separation of energy coming from the front and from that coming from the back of a cable, or the energy coming from one side of a cable from that coming from another side, etc.

The matrix S may typically be a 2-D filter that is applied in the common trace (receiver) or common offset domains, which is typically a 2-D collection of traces. In this case, interference may appear as noisy traces in a 2-D dataset. However, if S is configured to be a 3-D filter/matrix, such interference may appear as planes in a 3-D volume, rather than the spikes in the 2-D volume. In a 4-D volume, S may exhibit 3-D interference within a 4-D volume, and so on for 5-D or higher. In 2-D and 3-D coherency calculations, the interference may likely be limited to individual traces within the volume, and this interference typically appears as high-amplitude points within the 2-D or 3-D volumes where the reflection signals of interest appear as lines in a 2-D volume and planes in a 3-D volume. In the 4-D case the points become lines in the 4-D volumes and the reflected signals appear as 3-D volumes within the 4-dimensional volume. In the 5-D case, the interference noise appears as planes within the 5-D volume and the reflection signals appear as 3-D volumes within the 5-D volume. This ratio of the dimensionality of the noise to the signal may not improve after three dimensions, although in a particular instance (depending on the data, survey parameters, etc.) higher dimensional coherency calculations might be beneficial.

Calculating a preferred dimensionality of S may depend on the ratio of interference noise to signal, which may depend, in turn, on the size of the data volume and the configuration of the noise inside this volume. Typically the higher dimension volume may enhance the sparseness of the signal to be separated, but practical concerns (computability and volume size) may limit the applicability of the instant invention when used with the highest dimensions available. The form of S may become a compromise involving signal-to-noise ratio, sampling, and survey geometry.

To reduce the likelihood that interference from a shot does not generate coherent events in a set of shots being considered, sources are preferably activated at random times with respect to each other. When the seismic records are corrected for each source's zero time (i.e., activation time), the reflections related to that source may tend to be coherent, but the energy from interfering sources may tend to be incoherent (i.e., the reflections may not line up) since the delay between shots is random. Of course, there may be a need to review the data collected using random start times to avoid those instances where spurious coherency is produced by accident.

Marine sources that have random time delays of about a few hundred milliseconds may not require continuous recording, although continuous sampling does simplify the problem. An easy method of handling this case would be to have a fixed length of the output records that would be the maximum record length recorded minus the maximum delay time. The data would not be completely predicted, but the prediction at the times of interest should be good. As long as the times of the shots are recorded, the continuous recording, or at least the part of it involved in the inversion, can be reconstructed, although the output record length would be limited to the record length stated above.

Marine towed streamer surveys are likely to have random time delays limited to less than a second or so, as opposed to the more general form of simultaneous source acquisition where each shot may be at random times. Since marine surveys would tend to not have very strong signals overlapping with very weak signals, the data in the later part of the record could be scaled up to improve the convergence of the inversion. That is, since the inversion works from the highest amplitude events to the lowest amplitude, the shallow reflections would be separated in the first iterations, and the weak amplitudes on the deeper reflections would be separated in later iterations. Scaling up the deep data would allow both shallow and deep reflectors to be separated simultaneously.

In the case of continuous recording, there is no natural limit to the trace length that can be extracted from the continuously recorded data. An interesting aspect of this is that a single source could fire more often. In the marine case, assuming that the airguns could be pressured up fast enough, source activations could, for example, be set off every three seconds, but the trace length extracted might be six seconds or more. Assuming that the data so-recorded can be effectively separated as discussed herein, this approach would allow for closer shot spacings while maintaining the speed of the boats.

With respect to 4-D (time-lapse) surveys in particular, the instant invention allows the explorationist to balance length of a seismic record in time and the cost of having more time between shots. Obtaining low noise data is especially important in 4-D surveys, where the goal may be to identify very subtle changes in the subsurface reflectivity by comparing earlier surveys with later ones. When each survey has noise added from the previous shots, this noise may tend to appear within in the difference measurements and can mask the often very weak time-lapse measurements. That being said, in some circumstances, it is possible that the data extracted from a simultaneous source survey might be cleaner than that obtained from a traditional single-source survey, and that is especially true where time over which the separation is calculated is lengthened. In general, it should be noted that all practical seismic acquisition is actually simultaneous source acquisition, but shortcuts are taken and assumptions about the strength of the noise are made when the data are not processed as simultaneous sources.

Still further, interference that is caused where multiple (unrelated) seismic crews are operating in the same area at the same time is a troublesome issue. Cooperation between such crews—which typically are under the control of competing interests—inevitably means downtime for one crew while the other is shooting. However, when viewed from the standpoint of the instant invention, such unscheduled shots can potentially be removed as has been taught herein so long as they can be can be identified as to their precise location (coordinates) and time of source activation. Given those two parameters (and possibly a source signature as well), it would be possible to separate and remove signals corresponding to the foreign crews' shots as has been described previously. Although the large distances and limited directionality of the interfering shots may tend limit the usefulness of the separated data, in some instances such energy could actually prove to be useful and could provide long offset data for use in imaging, velocity determination, etc. Finally, note that it might be acceptable to the parties involved to exchange the shot coordinates and time information because such data would not necessarily give much insight into the ultimate target of the survey. Further, all parties involved would benefited by a shortened time in the field, which again argues for making this sort of exchange.

Additionally it should be noted that when operations are to be performed on traces of a particular type (e.g., a shot gather), it is normally not necessary to bring those seismic traces together in memory (e.g., via a sort) in order to apply multi-trace processes to them. Thus, in the disclosure above and the claims that follow, when it is said that a gather (e.g., shot gather, receiver gather, etc) is assembled or accessed for further processing, those words should be interpreted in their broadest sense to cover instances where the traces that comprise the gather are processed in place or on the fly. Thus, no sorting or other arranging of the data may necessarily be required.

Further, in some embodiments the instant invention may be adapted for use with a VSP, checkshot, or similar downhole survey. By way of explanation, VSP acquisition can be very expensive in terms of rig down time. Shooting faster VSPs with overlapping sources could be used to significantly reduce the costs of such surveys. Thus, when the phrase "blended seismic survey" is used herein, that phrase should be broadly interpreted to include both land and marine 2D and 3-D surveys as well as VSPs, cross hole surveys, etc.

It may be recognized that although one embodiment utilizes a standard sine and cosine based Fourier transform (and its associated transform and/or spectral values) that is not an absolute requirement. Indeed, there are any number of basis functions that could be used instead. All that is required is that the seismic data be expressible in terms of the coefficients of that function. For example, in some variations, instead of a Fourier-based frequency analysis, some other function might be used (e.g., Walsh transforms, wavelet transforms, Radon transform, etc.). Those of ordinary skill in the art may readily see how these coefficients could be used for purposes of noise attenuation in the same manner as the Fourier coefficients discussed previously. Thus, when the terms "frequency spectrum", "amplitude spectrum", or "Fourier components" are used herein, those terms should be broadly construed to include any collection of coefficients from a discrete transform (orthornomal or otherwise) that can be used to at least approximately reconstruct the seismic data from which the transform was calculated.

Further, in the previous discussion, the language has been expressed in terms of operations performed on conventional seismic data. But, it is to be understood the disclosed methods may be applied advantageously in other subject matter areas, and used to locate other subsurface minerals besides hydrocarbons. By way of example only, the same approach described herein could potentially be used to process and/or analyze multi-component seismic data, shear wave data, converted mode data, cross well survey data, VSP data, full waveform sonic logs, controlled source or other electromagnetic data (CSEM, t-CSEM, etc.), or model-based digital simulations of any of the foregoing. Additionally, the methods claimed herein after can be applied to mathematically transformed versions of these same data traces including, for example: filtered data traces, migrated data traces, frequency domain Fourier transformed data traces, transformations by discrete orthonormal transforms, instantaneous phase data traces, instantaneous frequency data traces, quadrature traces, analytic traces, etc. In short, the process disclosed herein can potentially be applied to a wide variety of types of geophysical time series, but it is preferably applied to a collection of spatially related time series.

Finally, although the language herein has often been couched in terms of seismic sources being "shots", that term should not be interpreted to mean that the source is explosive (e.g., dynamite). Instead, a "shot" should be understood to mean (as it is to those of ordinary skill in the art) a source activation, whether that source is dynamite, an air gun, a marine siren, a marine vibrator, seismic vibrator, etc. Likewise, the term "seismic source" may refer to any source of seismic energy, whether impulsive or non-impulsive, such as, without limitation, dynamite, an air gun, a marine siren, a marine vibrator, seismic vibrator, combinations thereof, and the like.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of seismic exploration, comprising:
   (a) positioning a seismic receiver boat at a location proximate a subsurface target, said seismic receiver boat pulling at least one seismic streamer therebehind, said at least one seismic streamer having a head end proximate to said receiver boat and a trailing end remote from said receiver boat;
   (b) positioning a first seismic source proximate to either said head end of said at least one seismic streamers or said trailing end of said plurality of seismic streamers;
   (c) positioning a second seismic source proximate an opposite end of said at least one seismic streamers from said first seismic source;
   (d) activating said first seismic source;
   (e) waiting a random length of time following said first seismic source activation and then activating said second seismic source, said random length of time being selected such that recorded seismic energy from said second source activation interferes with recorded seismic energy from said first source activation;
   (f) continuously recording reflected seismic energy from said activation of said first seismic source and from said activation of said second seismic source via said at least one seismic streamer, thereby obtaining a plurality of seismic traces that record at least said first and second seismic source activations;
   (g) performing at least (a) through (f) a plurality of times at a plurality of different locations proximate to said subsurface target while continuously recording, thereby obtaining a blended source seismic survey comprised of a plurality of source activations, wherein a sequence comprises said performing of at least (a) through (f) said plurality of times, said sequence comprising two or more activations of at least one of said first seismic source and said second seismic source; and, (h) using said blended source seismic survey to explore for hydrocarbons within said region of the subsurface.

2. The method of seismic exploration according to claim 1, wherein there is a lowest frequency of interest in said blended source seismic survey and wherein said random length of time of (e) is chosen to be longer than a wavelength of said lowest frequency of interest in said blended seismic survey.

3. The method of seismic exploration according to claim 1, wherein said first source comprises a plurality of marine air guns.

4. The method of claim 1, wherein (h) comprises:
(h1) selecting a particular source activation from among said plurality of source activations in said blended source seismic survey,
(h2) separating said selected source activation from said blended source seismic survey by using sparse inversion, thereby obtaining a single source gather, and,
(h3) using said single source gather to explore for hydrocarbons within said region of the subsurface containing structural or stratigraphic features conducive to the presence, migration, or accumulation of hydrocarbons.

5. The method of claim 1, wherein (h) comprises:
(h1) selecting a particular source activation from among said plurality of source activations in said blended source seismic survey,
(h2) separating said selected source activation from said blended source seismic survey to obtain a single source gather by solving $$d = \Gamma S\, m,$$

where,
d is said selected particular source activation,
m is said single source gather,
S is a matrix or operator that constrains m by requiring similarity between nearby source activations, and,
$\Gamma$ is a blending matrix which describes at least an activation time of said particular source activation.

6. A method of seismic exploration, comprising:
(a) in a computer, accessing a blended source seismic survey collected by a method comprising:
(1) positioning a seismic receiver boat at a location proximate to a subsurface target, said seismic receiver boat pulling at least one seismic streamer therebehind, said at least one seismic streamer having a head end proximate to said receiver boat and a trailing end remote from said receiver boat;
(2) activating a first seismic source at a location proximate to said head end or said trailing end of said at least one seismic streamer;
(3) waiting a random length of time following said first seismic source activation and then activating a second seismic source at a location laterally offset from said at least one seismic streamer, said random length of time being selected such that seismic energy recorded by said at least one streamer from said second source activation interferes with recorded seismic energy from said first source activation;
(4) continuously recording reflected seismic energy from said activation of said first seismic source and from said activation of said second seismic source via said at least one seismic streamer, thereby obtaining a plurality of seismic traces that record at least said first and second seismic source activations;
(5) performing at least steps (1) through (4) a plurality of times at a plurality of different locations proximate to said subsurface region while continuously recording, thereby obtaining said blended source seismic survey, wherein a sequence comprises said performing of at least (1) through (4) said plurality of times, said sequence comprising two or more activations of at least one of said first seismic source and said second seismic source; and,
(b) using said blended source seismic survey to explore for hydrocarbons within subsurface region.

7. The method of seismic exploration according to claim 6, wherein there is a lowest frequency of interest in said blended source seismic survey and wherein said random length of time of (a)(3) is chosen to be longer than a wavelength of said lowest frequency of interest in said blended seismic survey.

8. The method of seismic exploration according to claim 6, wherein said first seismic source comprises a plurality of marine air guns.

9. The method of claim 6, wherein (b) comprises:
(b1) selecting a particular source activation from among said plurality of source activations in said blended source seismic survey,
(b2) separating said selected source activation from said blended source seismic survey by using sparse inversion, thereby obtaining a single source gather, and,
(b3) using said single source gather to explore for hydrocarbons within said region of the subsurface containing structural or stratigraphic features conducive to the presence, migration, or accumulation of hydrocarbons.

10. The method of claim 6, wherein step (b2) comprises:
(i) selecting a particular source activation from among said plurality of source activations in said blended source seismic survey,
(ii) separating said selected source activation from said blended source seismic survey to obtain a single source gather by solving $$d = \Gamma S\, m,$$

where,
d is said selected particular source activation,
m is said single source gather,
S is a matrix or operator that constrains m by requiring similarity between nearby source activations, and, $\Gamma$ is a blending matrix which describes at least an activation time of said particular source activation.

11. A method of seismic exploration, comprising:
(a) positioning a seismic receiver boat at a location proximate a subsurface target, said seismic receiver boat pulling at least one seismic streamer therebehind, said at least one seismic streamer having a head end proximate to said receiver boat and a trailing end remote from said receiver boat;
(b) positioning a first seismic source proximate to either said head end of said at least one seismic streamers or said trailing end of said plurality of seismic streamers;
(c) positioning a second seismic source laterally offset from said first seismic source, the first and second seismic source forming a first pair;
(d) activating said first seismic source;
(e) waiting a random length of time following said first seismic source activation and then activating said second seismic source, said random length of time being selected such that recorded seismic energy from said second source activation interferes with recorded seismic energy from said first source activation;
(f) continuously recording reflected seismic energy from said activation of said first seismic source and from said activation of said second seismic source via said at least one seismic streamer, thereby obtaining a plurality of seismic traces that record at least said first and second seismic source activations;

(g) performing at least steps (a) through (f) a plurality of times at a plurality of different locations proximate to said subsurface target while continuously recording, thereby obtaining a blended source seismic survey comprised of a plurality of source activations, wherein a sequence comprises said performing of at least (a) through (f) said plurality of times, said sequence comprising two or more activations of at least one of said first seismic source and said second seismic source; and, (h) using said blended source seismic survey to explore for hydrocarbons within said region of the subsurface.

12. The method of claim 11, further comprising:

positioning one or more additional pairs of seismic sources proximate to the seismic receiver boat, wherein each additional pair of seismic source comprises a first seismic source and a second seismic source; and activating the one or more additional pairs of seismic sources after (e).

13. The method of claim 12, wherein the first and second seismic sources in the one or more additional pairs are laterally offset from one another.

14. The method of claim 12, wherein the activating the one or more pairs comprises, for each additional pair of seismic sources, waiting a random length of time following activation of the first seismic source in the one more additional pairs and then activating the second seismic source in the one or more additional pairs, said random length of time being selected such that recorded seismic energy from each said second source activations interferes with recorded seismic energy from each of said first source activations.

15. The method of claim 14, wherein the random length of time comprises a pseudo-random length of time.

16. The method of claim 11, wherein the first seismic source and the second seismic source each comprises an air gun, a vibrator, a resonator, a siren, or combinations thereof.

17. A method of seismic exploration, comprising:

(a) positioning a seismic receiver boat at a location proximate a subsurface target, said seismic receiver boat pulling at least one seismic streamer therebehind, said at least one seismic streamer having a head end proximate to said receiver boat and a trailing end remote from said receiver boat;

(b) positioning a first seismic source proximate to either said head end of said at least one seismic streamers or said trailing end of said plurality of seismic streamers;

(c) positioning a second seismic source proximate an opposite end of said at least one seismic streamers from said first seismic source;

(d) activating a first source;

(e) waiting a random length of time following said first source activation and then activating a second source, said random length of time being selected such that recorded seismic energy from said second source activation interferes with recorded seismic energy from said first source activation, wherein said first source comprises said first seismic source or said second seismic source and said second source comprises said first seismic source or said second seismic source;

(f) continuously recording reflected seismic energy from said activation of said first source and from said activation of said second source via said at least one seismic streamer, thereby obtaining a plurality of seismic traces that record at least said first and second source activations; and (g) performing at least (a) through (f) a plurality of times at a plurality of different locations proximate to said subsurface target while continuously recording, thereby obtaining a blended source seismic survey comprised of a plurality of source activations, wherein a sequence comprises said performing of at least (a) through (f) said plurality of times, said sequence comprising two or more consecutive activations of at least one of said first seismic source and said second seismic source.

* * * * *